(12) United States Patent
Abumustafa

(10) Patent No.: US 8,197,239 B2
(45) Date of Patent: Jun. 12, 2012

(54) FLOW-CONTROL VALVE DEVICE FOR A PUMP

(75) Inventor: Anwar Abumustafa, Darmstadt (DE)

(73) Assignee: Luk Fahrzeug-Hydraulik GmbH & Co. KG, Bad Homburg v.d.H. (DE)

( * ) Notice: Subject to any disclaimer, the term of this patent is extended or adjusted under 35 U.S.C. 154(b) by 828 days.

(21) Appl. No.: 10/590,284

(22) PCT Filed: Feb. 17, 2005

(86) PCT No.: PCT/DE2005/000270
§ 371 (c)(1),
(2), (4) Date: Apr. 19, 2007

(87) PCT Pub. No.: WO2005/083308
PCT Pub. Date: Sep. 9, 2005

(65) Prior Publication Data
US 2007/0243080 A1 Oct. 18, 2007

(30) Foreign Application Priority Data
Feb. 28, 2004 (DE) .......................... 10 2004 009 829

(51) Int. Cl.
*F04B 39/10* (2006.01)
*F04B 53/12* (2006.01)
(52) U.S. Cl. ...................................................... 417/553
(58) Field of Classification Search .................. 417/414, 417/300, 110, 115, 10, 553; 251/324, 325; 137/115.05, 625.38
See application file for complete search history.

(56) References Cited

U.S. PATENT DOCUMENTS

| | | | | | |
|---|---|---|---|---|---|
| 1,783,762 | A | * | 12/1930 | Yarnall et al. | 277/529 |
| 2,747,612 | A | * | 5/1956 | Shih-Ying Lee | 251/324 |
| 3,978,879 | A | * | 9/1976 | Termansen et al. | 137/115.16 |
| 4,360,322 | A | * | 11/1982 | Bristow et al. | 417/300 |
| 4,549,566 | A | * | 10/1985 | Fujiwara et al. | 137/115.09 |
| 5,385,329 | A | * | 1/1995 | Phillips | 251/77 |
| 5,513,672 | A | * | 5/1996 | Nguyen et al. | 137/115.06 |
| 5,639,066 | A | * | 6/1997 | Lambert et al. | 251/282 |
| 6,244,295 | B1 | * | 6/2001 | Bartussek et al. | 137/540 |
| 6,244,566 | B1 | * | 6/2001 | France et al. | 251/263 |
| 7,146,998 | B2 | * | 12/2006 | Nirasawa et al. | 137/115.18 |

FOREIGN PATENT DOCUMENTS

| | | |
|---|---|---|
| DE | 199 15 319 A1 | 3/2000 |
| DE | 10 2005 007 306 | 9/2005 |
| GB | 365 890 | 1/1932 |

\* cited by examiner

*Primary Examiner* — Devon C Kramer
*Assistant Examiner* — Amene Bayou
(74) *Attorney, Agent, or Firm* — Davidson, Davidson & Kappel, LLC

(57) ABSTRACT

A pump, especially a power-steering pump, having a flow-control valve device that has a piston arranged inside a piston bore so as to be displaced. The piston bore has at least one inlet and at least one outlet channel. The piston has an axial inlet opening and a plurality of substantially radial outlet openings as well as a continuous outlet groove between a first collar and a second collar, representing a control edge for an outlet fluid flow. The axial inlet opening extends at least to the beginning of the radial, lateral outlet openings in a substantially cylindrical manner and the continuous outlet groove widens in terms of its radial depth on the outer circumference of the piston towards the control edge.

6 Claims, 2 Drawing Sheets

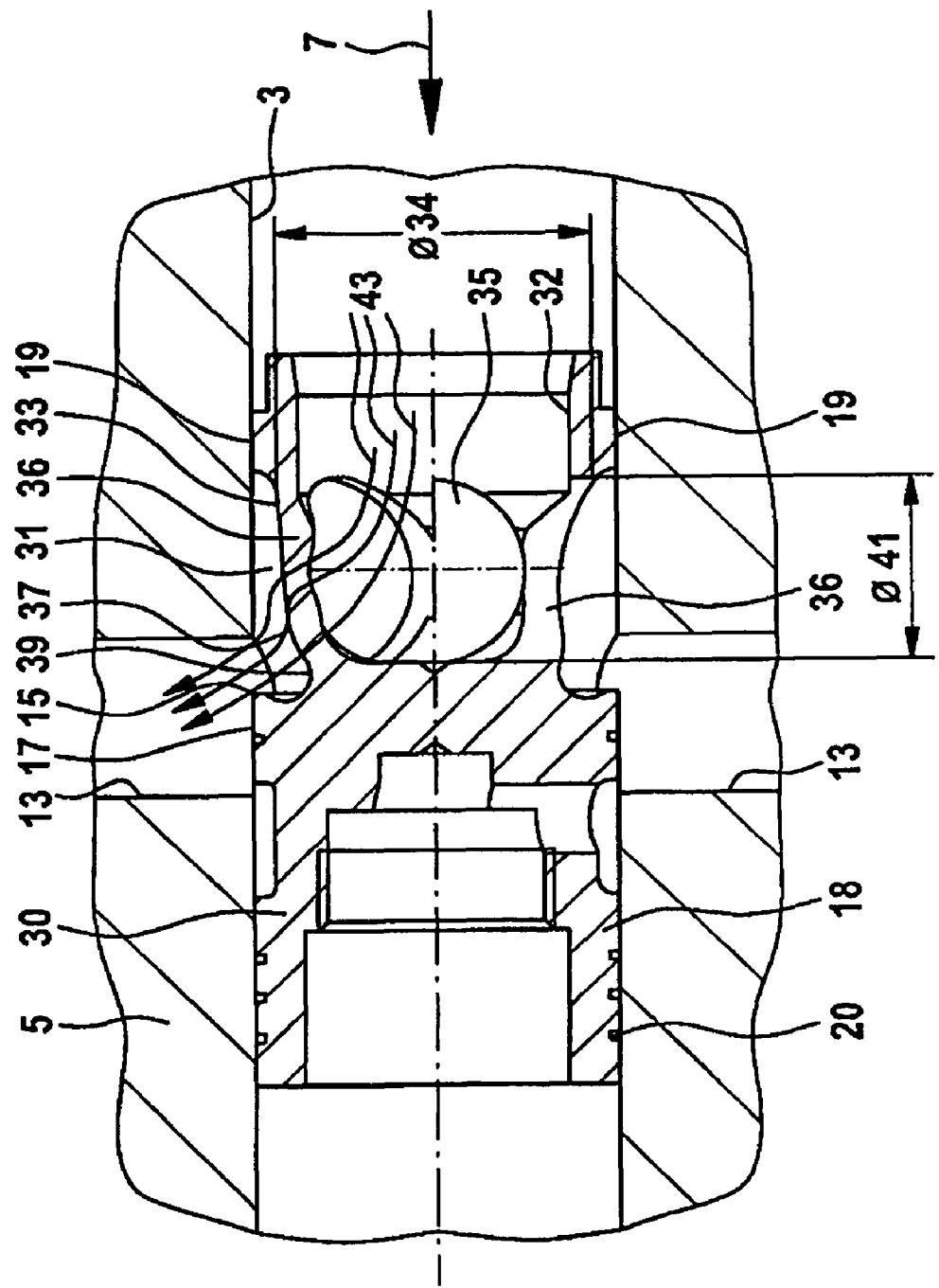

FLOW-CONTROL VALVE DEVICE FOR A PUMP

BACKGROUND

The present invention relates to a pump, in particular to a power-steering pump, having a flow-control valve device, the flow-control valve device having a piston that is displaceably accommodated within a piston bore, and the piston bore having at least one inflow channel and at least one outflow channel, and the piston having an axial inflow orifice and a plurality of substantially radial outflow orifices, and a circumferential outflow groove disposed between a first collar and a second collar which forms a control edge for an outflowing fluid flow.

Pumps of this kind are known, but there is an inherent problem associated therewith. Since, for example, upon activation of the pressure limiting function, the entire pump volumetric flow must be delivered through the axial inflow orifice and the radial outflow orifices, it is essential that the circumferential outflow groove disposed between the piston and the piston bore be relatively deep. This results in a small outside piston diameter in the area of the radial outflow orifices, which, in turn, necessitates relatively small diameters of the radial outflow orifices to ensure that the webs remaining between the radial outflow orifices are stable enough to absorb the axial forces acting on the piston.

The relatively small radial outflow orifices result in relatively high flow resistances, which lead to pressure losses and thus to charging losses on the intake side of the pump.

SUMMARY OF THE INVENTION

An object of the present invention is to devise a pump which will overcome these disadvantages.

This objective is achieved by a pump, in particular by a power-steering pump, having a flow-control valve device, the flow-control valve device having a piston that is displaceably accommodated within a piston bore, and the piston bore having at least one inflow channel and at least one outflow channel, and the piston having an axial inflow orifice and a plurality of substantially radial outflow orifices, and a circumferential outflow groove disposed between a first collar and a second collar which forms a control edge for an outflowing fluid flow, the axial inflow orifice extending substantially cylindrically at least to the beginning of the radial, lateral outflow orifices, and the circumferential outflow groove widening in terms of its radial depth on the outer circumference of the piston towards the control edge. A pump is preferred in which the outflow groove widens slightly conically on the piston side and subsequently arcs radially inwardly in the control edge region to reach its greatest depth. These features advantageously enable the radial, lateral outflow orifices to be located in a piston region having a relatively large outside diameter, so that they, in turn, may have a relatively large diameter as well, thereby making it possible for the webs disposed therebetween to be stable enough to absorb the axial forces, and to then transition in the area of the control edge into a deepened outflow groove capable of directing the entire oil flow relatively losslessly to the control edge.

A pump is also preferred in which the diameters of the radial outflow orifices extend from the axial cylindrical inflow orifice into the radially inwardly directed arc in the control edge region. Here, the advantage is derived that the radial outflow orifices are relatively large and thus relatively low-resistance.

In addition, a pump is preferred in which the piston has altogether three collars. This has the advantage that the first and the third collars may guide the piston as so-called piston-guide ribs, without being subjected to erosion by outflowing fluid, while the second collar which forms the control edge of the valve piston, may, in fact, be subjected to a certain erosion by the flow, but is not required to assume the guide functions of the first and third collars.

In addition, a piston is preferred, in which the collars have circumferential pressure-equalization grooves. Here the advantage is derived that, even given an asymmetrical seating of the piston in the bore and resultant differences in pressure conditions on the piston circumference, the pressures are able to be compensated by the equalization grooves to prevent the piston from locking hydraulically.

It is a feature of a pump according to the present invention that the piston may include a pressure-relief pilot valve. Here, the advantage is derived that the pump housing does not require a separate mount for the pressure-relief pilot valve.

BRIEF DESCRIPTION OF THE DRAWINGS

The present invention is described below in greater detail with reference to the figures, which show:

FIG. 2 a piston according to the present invention.

DETAILED DESCRIPTION

Figure 1:
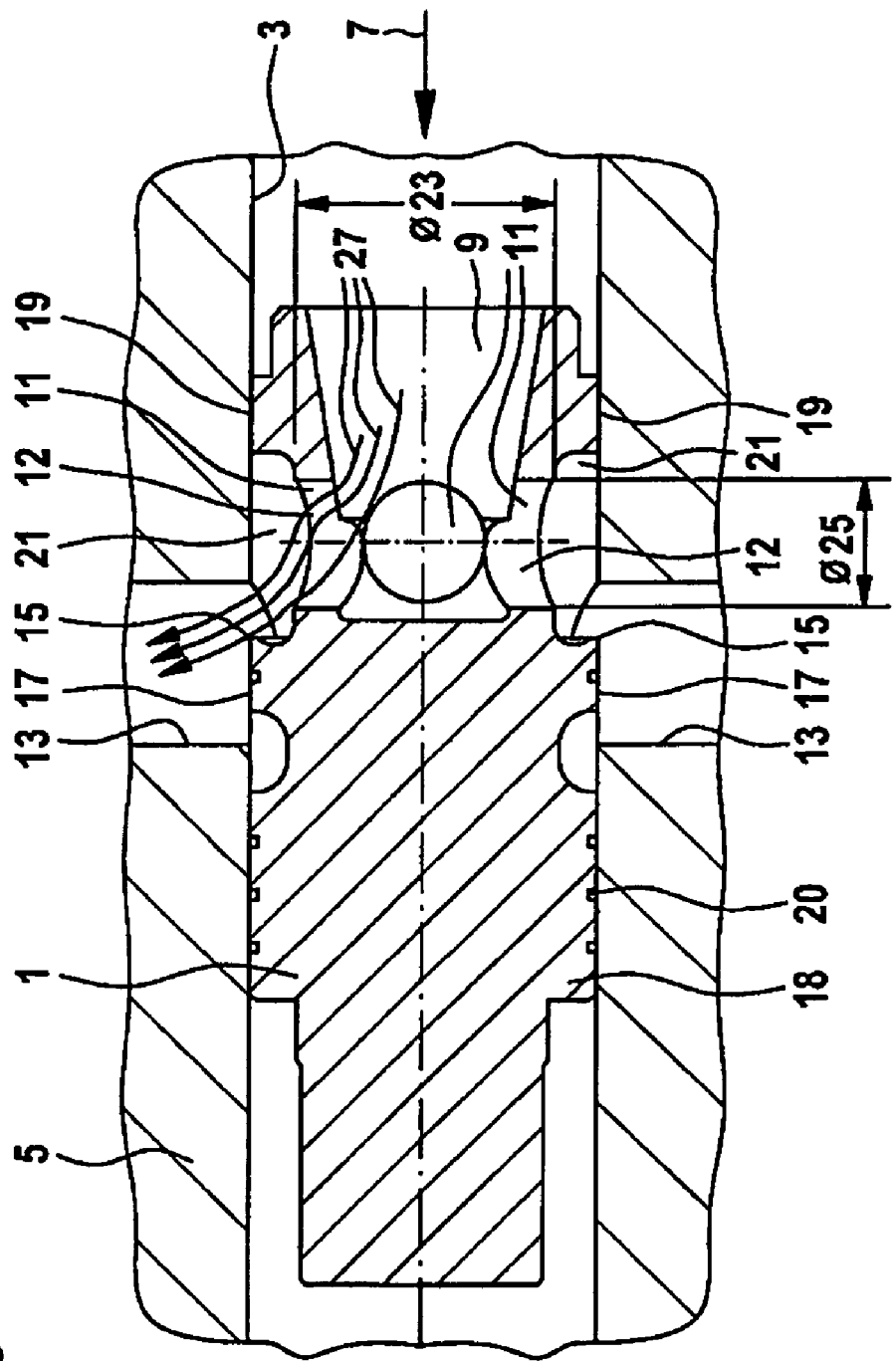
FIG. 1 a conventional piston.

A flow-control valve piston 1 according to the related art is shown in FIG. 1. Flow-control valve piston 1 is guided in a valve bore 3, which, for example, may be incorporated in pump housing 5. A fluid flow generated by the pump, indicated here by an arrow 7, traverses valve bore 3, which also represents an inflow channel, into an axial inflow orifice 9 of valve piston 1. Axial inflow orifice 9 narrows conically into the piston. Axial inflow orifice 9 leads into four radial outflow orifices 11, which form axial webs 12 in the spaces therebetween. In addition, valve bore 3 has two radial outflow bores 13 in pump housing 5. Valve piston 1 is positioned in valve bore 3 in such a way that its control edge 15 partially uncovers outflow bores 13. Control edge 15 is formed on a piston collar 17. In addition, between collar 17 having control edge 15 and a guide collar 19, valve piston 1 has a circumferential outflow groove 21. A certain radial depth is required of circumferential groove 21 to enable it to direct the entire pump delivery volume into outflow channels 13. This results in a relatively small diameter 23 of the piston in the area of circumferential outflow groove 21 in which the four radial outflow orifices 11 must be accommodated. Therefore, relatively small diameter 23 necessitates that outflow orifices 11 be fabricated with only a relatively small diameter 25, to enable webs 12 remaining between outflow orifices 11 to absorb the axial forces acting on the piston. Thus, relatively small diameters 25 of outflow orifices 11 produce a relatively high hydraulic resistance, which may lead to pressure losses and thus to charging problems on the intake side of the pump. It is also discernible by lines of flow 27 sketched in representatively, that the flow must press through the relatively narrow cross sections of radial outflow orifices 11.

FIG. 2 shows a valve piston 30 according to the present invention. Those features having the same structure as in FIG. 1, such as piston bore 3, pump housing 5, outflow bores 13 in the pump housing, control edge 15 on middle piston collar 17, as well as guide collar 19, have the same functions as in FIG. 1 and are, therefore, provided with the same reference numerals. The features that have been modified on the piston according to the present invention in comparison with FIG. 1 are provided with new reference numerals. Piston 30 has a cylindrical axial inflow orifice 32. Compared to the related art, circumferential outflow groove 31 has a completely different groove shape. It begins in region 33 with a relatively shallow radial depth and continues axially, slightly conically towards control edge 15. As a result, a substantially larger diameter 34 is obtained as compared to diameter 23 from FIG. 1, with the result that the diameters of outflow orifices 35 may be substantially larger than under the related art, while webs 36 characterized by adequate stability are retained. However, to achieve an adequate depth of circumferential outflow groove 31 in the area of control edge 15, the outflow groove in this area is expanded by a radially inwardly extending arc 37 until it reaches its greatest depth 39. Thus, as a result of these features, given a great enough depth of the circumferential outflow groove, a relatively large diameter 41 of radial outflow orifices 35 is achieved, which leads to substantially low resistances and thus to flows whose lossless characteristics are correspondingly enhanced and to an improved charging of the pump. Based on the pattern of flow threads 43, it is discernible precisely in the area of radial outflow orifices 35 that the flow threads may be spaced further apart from one another, and thus the flow pattern is not as compressed as in FIG. 1.

In addition, FIG. 2 shows a valve piston 30 that has altogether three collars 17, 18 and 19. This has the advantage that the first and the third collars 19 and 18 may guide the piston 30 as so-called piston-guide ribs, without being subjected to erosion by outflowing fluid, while the second collar 17, which forms the control edge 15 of the valve piston 30, may, in fact, be subjected to a certain erosion by the flow, but is not required to assume the guide functions of the first and third collars 19 and 18.

Furthermore, FIG. 2 shows a valve piston 30 in which the collars 17, 18 and 19 have circumferential pressure-equalization grooves 20. Here the advantage is derived that, even given an asymmetrical seating of the piston 30 in the bore 3 and resultant differences in pressure conditions on the piston circumference, the pressures are able to be compensated by the pressure-equalization grooves 20 to prevent the piston from locking hydraulically.

Additionally, the embodiment of valve piston 30 in accordance with the present invention makes it possible for the charging pressure on the intake side of the pump to be raised from approximately 0.2 bar to 0.5 bar and thus for the pump's cavitation danger to be substantially reduced.

The present invention is, therefore, based on the idea of the outer diameter of piston 30 initially continuing as a large diameter in circumferential groove 31 for as long as possible, to permit the largest possible radial outflow orifices 35, while maintaining an adequate web thickness. Not until just before control edge region 15 is circumferential outflow groove 31 pulled inwardly. However, since outflow orifices 35 become smaller again in this region, an adequate web width is ensured in their secantial extension.

LIST OF REFERENCE NUMERALS 1 flow-control valve piston
3 valve bore
5 pump housing
7 fluid flow
9 axial inflow orifice
11 radial outflow orifices
12 axial webs
13 radial outflow bores
15 control edge
17 piston collar having control edge
18 guide piston collar
19 guide piston collar
20 pressure-equalization grooves
21 circumferential outflow groove
23 piston diameter in outflow groove 21
25 diameter of outflow orifices 11
27 lines of flow
30 valve piston according to the present invention
31 circumferential outflow groove of piston 30
33 conical region of outflow groove
34 piston diameter in outflow groove 31
35 radial outflow orifices
36 webs
37 arc-shaped region of outflow groove 31
39 greatest depth of outflow groove 31
41 diameter of outflow orifices 35
32 cylindrical axial inflow orifice of piston 30
43 flow threads

What is claimed is:

1. A pump comprising:
a flow-control valve device including a piston displaceably accommodated within a piston bore, the piston bore having at least one inflow channel and at least one outflow channel, and the piston having an axial inflow orifice and a plurality of radial, lateral outflow orifices and a circumferential outflow groove disposed between a first collar and a second collar, the second collar forming a control edge for an outflowing fluid flow,
the axial inflow orifice extending cylindrically at least to a beginning of the radial, lateral outflow orifices, and the circumferential outflow groove expanding in terms of a radial depth on an outer circumference of the piston towards the control edge.

2. The pump as recited in claim 1 wherein the outflow groove expands in a conical form on a piston side and, as the result of a radially, inwardly directed arc, subsequently reaches a greatest depth in a region of the control edge.

3. The pump as recited in claim 2 wherein diameters of the radial outflow orifices extend from the axial, cylindrical inflow orifice into the radially, inwardly directed arc in the control edge region.

4. The pump as recited in claim 1 wherein the piston includes a third collar.

5. The pump as recited in claim 1 wherein the first and second collars have circumferential pressure-equalization grooves.

6. The pump as recited in claim 1 wherein the pump is a power-steering pump.

* * * * *